2,923,698
WATER REPELLENT, METHOD OF PREPARING SAME AND TEXTILE COATED THEREWITH

John B. Rust, Verona, and William B. Canfield, Montclair, N.J.

No Drawing. Application November 4, 1952
Serial No. 318,743

16 Claims. (Cl. 260—70)

This invention relates to water repellent compositions particularly useful for application to textiles, to the treated textiles, to products useful in making said compositions, and to methods of making said compositions, said products, and said treated textiles.

A number of methods and compositions have heretofore been used in the production of water repellent textiles. Many of the compositions so used are not very stable particularly in the presence of water. Such instability necessitates the use of substantially anhydrous steps in making them, and relatively short shelf life for the compositions. Further, many of the prior art treatments did not give water-repelling of satisfactory resistance to laundering.

Among the objects of the present invention is the production of compositions that yield satisfactory water-repellency to textiles.

Further objects include such compositions which are substantially stable against moisture.

Still further objects include the textiles of improved water repellency and substantial resistance to laundering, and to methods of making such treated textiles and the compositions for use thereon.

Still further objects and advantages will appear from the more detailed description set forth below given by way of illustration and not by way of limitation since various changes therein may be made by those skilled in the art without departing from the scope and spirit of the invention.

In accordance with the present invention it has been found that water-dispersible materials of particular value for imparting water repellency to textiles and fabrics may be desirably produced by reacting a higher fatty acid amide with a formaldehyde yielding substance, then reacting the resulting product with a secondary amine whereupon a tertiary amine reaction product is obtained. The latter reaction product is then converted into a water-soluble or water dispersible non-quaternary tertiary amine salt. Such products are particularly useful as water-repellents for treating textiles and fabrics but may also be useful as coating compositions to cover textiles and fabrics. In such utilizations, these water-repellents may be suspended in water or other aqueous media and used to impregnate the textile or fabric as by immersion or padding techniques. Upon heating at elevated temperatures, a water-repellent durable finish is obtained.

The fatty acid amide used may be any of the higher or long chain fatty acid derivatives. They desirably should contain at least nine carbon atoms and preferably eighteen or more including 20, 22, 24 carbon atoms and higher. Exemplary fatty acid amides are stearamide, palmitamide, lauramide, methylene distearamide, ethylene distearamide, etc.

Any substance yielding formaldehyde may be used as an initial reactant such as aqueous formaldehyde, paraformaldehyde, methylal, hexamethylenetetramine, etc.

The secondary amine may vary and includes alkyl and alkylolamines desirably of alkyls of not more than five carbons such as diethylamine, dibutylamine, etc., dialkylolamines such as diethanolamine, cyclic amines containing both five and six membered rings including morpholine, piperidine, and the like, particularly heterocyclics like piperidine and lower carbon containing compounds.

The reaction products are made by heating the stated reactants at moderate temperatures for example from 60–90° C., although higher temperatures as for example refluxing temperatures may be used. Reaction products of the fatty acid amide, the formaldehyde and the secondary amine as generally prepared if suspended in water, padded on textiles and heated at elevated temperatures of 120–200° C. form repellent finishes which are not generally sufficiently durable. Accordingly, these reaction products are converted into non-quaternary water dispersible tertiary amine salts by reaction as by heating with acids, acid salts and other compounds capable of producing the tertiary amine salt.

Such non-quaternary salt forming agents include both organic and inorganic materials such as acids and compounds which yield acids on hydrolysis, an acid, for example: concentrated hydrochloric acid, concentrated sulphuric acid, concentrated phosphoric acid, acetic acid, phosphorus trichloride, phosphorus tribromide, phosphorus oxychloride, phosphorus pentachloride, thionyl chloride, silicon tetrachloride, stannic chloride, anhydrous aluminum chloride, zinc chloride, titanium tetrachloride, zirconium sulphate, zirconium oxychloride, and the like. Such resulting reaction products are non-quaternary, are water-dispersible, and when applied to textiles or fabrics and heated at elevated temperatures such as 120–200° C. give durable water-repellent finishes substantially resistant to laundering.

In order to allow these products to be more easily handled they may be made into a paste with water, alcohols such as methanol, ethanol, isopropanol, and the like, dioxane, ethyl acetate, xylene, and the like. Such pastes are readily emulsifiable and their water dispersions impart excellent water-repellent characteristics to textile fibers.

Products of a more complex nature may be made by inclusion of a nitrogenous compound having a plurality of nitrogen atoms with aldehyde-reactive N-hydrogen thereon such as urea, thiourea, guanidine, dicyandiamine, melamine, alkylolmelamines, polyalkoxy methyl melamines, and the like. In the latter types of compounds the alkyl groups are desirably lower alkyls as from 1 to 5 carbon atoms. These more complex products can be made in any desired way as by including the nitrogenous compound in an initial reaction stage with the fatty acid amide and formaldehyde yielding substance, or by reacting the nitrogenous compound with formaldehyde to give a polymethylol derivative such as hexa methylol melamine which is then heated with the fatty acid amide with or without additional formaldehyde yielding substance, etc., or by reacting the fatty acid amide with a polyalkoxy methyl derivative of the nitrogenous compound such as hexaethoxy methyl melamine, with or without added formaldehyde yielding substances, and completing the reactions by heating with secondary amine, etc.

Besides the active ingredients of the water repellents of the present invention, use may be made of mixtures of the active ingredients with waxes or metallic soaps such as candelilla wax, montan wax, carnauba wax and the like, and aluminum stearate, zinc stearate, barium stearate, aluminum palmitate, strontium stearate, cerium stearate, lead stearate, strontium palmitate and the like.

The water dispersible products may be used to impregnate textiles or fabrics in any desired way. Dispersed in water or other aqueous media they may be applied by immersion or padding. Any concentrations may be used for this purpose, from 1–10% by weight of the water repellent material being satisfactory although other concentrations may be used. Agitation in water at 70–80° C. may be used to produce the dispersion. The amount deposited on the textile or fabric will vary with the ultimate result desired. From 1 to 10% by weight on the fabric or textile is usually ample. After impregnation, excess may be removed as by squeezing, and the fabric or textile dried. Any desired drying operation may be used. For example, 15–20 minutes at 60° C. may be used, or higher temperatures with or without circulating air currents may be used, for instance 1–2 minutes at 100–110° C. in a current of air. After drying usually at a temperature of from 60–120° C. for up to 10 minutes, a curing treatment is desirable by heating to set the material generally at from 120° to 200° C. for from 1 to 10 minutes. Such heating is usually at a temperature above that of drying, for instance 140–145° C. for about 15 minutes, or at 160–165° C. for from 2 to 5 minutes, or 170° C. for one minute. The conditions of curing depend on factors such as temperature, time of heating, character of reaction products, etc.

Water repellency is obtained which is fast to both dry cleaning and washing with soap. The water repellent materials are stable to moisture and exhibit substantial shelf-life.

The products of the present invention are compatible with and may be blended with synthetic resins such as urea-formaldehyde, melamine-formaldehyde, and the like, as well as with natural or synthetic waxes to impart advantageous properties to treated fabrics in addition to water-repellency.

The following examples will illustrate the invention, parts being by weight unless otherwise indicated:

I

One mole of melamine, 6 moles of 37% aqueous formaldehyde, and 2 moles of stearamide and sufficient isopropanol to give a product having 60% solids are charged into a 3 liter 3-neck flask provided with a thermometer, mechanical stirrer, and water-cooled condenser. The batch is heated by means of a hot water bath to 60° C. in ½ hour and this temperature maintained for an additional ½ hour. The temperature is increased to 80° C. and held for 3 hours. A clear, relatively viscous solution was secured. Although for some purposes it may be desirable to remove the water from the reaction mixture by an alcoholic azeotropic distillation, such a distillation is not necessary in the formation of these reaction products. Finally 2 moles of paraformaldehyde and 2 moles of morpholine are now added and heating continued at 70–75° C. for 1 hour. Stoichiometric proportions of acid or acid salt are now added and heating continued for ½ to 1 hour. A relatively soft paste containing 50%–60% active ingredients is secured which is completely water-dispersible.

II 56.5 parts of stearamide, 54.2 parts of 99% isopropanol, and 6 parts of paraformaldehyde were heated together at 80° C. for 5 hours. 17.4 parts of morpholine were added and heating continued for ½ hour. The material was not water dispersible. 8.5 parts of silicon tetrachloride were added and heating continued at 70° C. for 1½ hours. A relatively soft paste was secured which was completely dispersible in hot water.

III 25.2 parts of melamine, 96 parts of 37% aqueous formaldehyde, 113.2 parts of stearamide, and 400 parts of isopropanol were heated together in a one liter 2-neck flask provided with a thermometer, mechanical stirrer, and a distilling column attached to a water cooled condenser set up for distillation. The batch was heated to 60° C. in ½ hour, and then held at 60°–70° C. for ½ hour. The temperature was raised to 82° C. and held at this temperature while removing 250 grams of water-isopropanol mixture. 12 parts of paraformaldehyde were added at 70° C. followed by 34.8 grams of morpholine. While maintaining the batch at 60° C.–65° C. a solution containing 17 parts of silicon tetrachloride in 17 parts of dioxane were added dropwise over a period of ½ hour. When cooled a soft, cream-like water dispersible paste was formed.

IV 63 parts of melamine, 240 parts of 37% aqueous formaldehyde, 141.5 parts of candelilla wax, and 442.5 parts isopropanol (99%) were heated to 76° C. in one hour, and heating continued at 70° C.–80°C. for 1½ hours. The bath was cooled to 70° C. and 87.1 parts of morpholine and 30 parts of paraformaldehyde added. Heating was continued for 1 hour at 70° C. A soft wax-like product resulted containing 42.5% active ingredients.

A number of acids and acid salts were tested and employing 30 grams of the above product; the resulting tertiary amine salts were then dispersed in water to form a 10% dispersion thereof. The following table includes the proportion of acid or acid salt used to combine in each case with the entire batch of 1287 grams containing 87.1 grams or one mole of morpholine.

| Material | Grams Employed for 1287 gram Product | Degree of Dispersibility | pH of 10% bath |
|---|---|---|---|
| (A) Silicon tetrachloride | 42.5 | Completely | 5.0 |
| (B) Stannic Chloride | 65.1 | do | 3.0 |
| (C) Phosphorus Trichloride | 45.8 | do | 5.0 |
| (D) Zirconium Oxychloride | 161.0 | do | 6.0 |
| (E) Titanium Tetrachloride | 49.9 | do | 5.0 |
| (F) Phosphorus Oxychloride | 51.1 | do | 4.5 |
| (G) Thionyl Chloride | 39.7 | do | 5.0 |
| (H) 98% Sulphuric Acid | 50.0 | do | 5.0 |
| (I) 85% Phosphoric Acid | 38.4 | do | 5.0 |
| (J) 36% Hydrochloric Acid | 100.0 | do | 5.0 |
| (K) Glacial Acetic Acid | 60.0 | do | 6.0 |
| (L) No Acid Control | | Very milky | 7.0 |

5 oz. poplin was padded from baths A, C, D, J, K, and L; dried at 60° C. and cured for 3 minutes at 150° C. The following spray ratings were secured after neutralizing, washing and dry cleaning.

| Product | Spray Rating | | |
|---|---|---|---|
| | Initial | Washed | Dry Cleaned |
| A | 100 | 100 | 70 |
| C | 100 | 100 | 70 |
| D | 100 | 100 | 70 |
| J | 100 | 100 | 70 |
| K | 90 | 90 | 80 |
| L | 70 | 0 (wet through) | 70 |

V 63 parts of melamine, 240 parts of 37% aqueous formaldehyde, 800 parts of ethanol, and 424.5 parts of stearamide were charged into a 3 liter three neck flask provided with a thermometer, mechanical stirrer, and a distilling column attached to a condenser for distillation. The batch was heated by means of a hot water bath to 60° C. in one-half hour, and thence at 60°–70° C. for ½ hour. The temperature of the bath was slowly increased to 80°–85° C. and the water removed by an alcohol-water azeotropic distillation. After 2000 parts of distillate had been removed the alcohol distilled over water freed 500 parts of dioxane was then added and distillation continued until all ethanol had been replaced with dioxane. 37.5 parts of paraformaldehyde and 125 parts of morpholine were now added and the temperature maintained at 70° C. for ½ hour. A solution containing 63.8 parts of silicon tetrachloride in 63.8 parts of dioxane was added dropwise over a period of 1 hour.

A water dispersible, soft paste resulted containing 40% solids.

30 parts of the above paste were dissolved in 270 parts of water at 75° C. to form a homogeneous dispersion. A paste of 5 oz. O. D. poplin fabric was padded, dried at 120° C. for 3 minutes and then baked at 150° C. for 3 minutes. The treated textile showed an initial spray rating of 100 after neutralization, a spray rating of 100 after a 2 hour wash with aqueous soap solution, and a spray rating of 80 after 3 successive dry cleanings.

VI 63 parts of melamine, 240 parts of 37% aqueous formaldehyde solution, 283 parts of stearamide, 141.5 parts of candelilla wax, and 800 parts of ethanol were charged into a 3 liter 3 neck flask provided with a thermometer, mechanical stirrer, and a distilling column attached to a condenser for distillation. The bath was heated by means of a hot water bath to 60° C. in ½ hour, and thence at 60°–70° C. for ½ hour. The temperature of the batch was slowly increased to 80°–85° C. and the water removed by an azeotropic distillation. After 2000 parts of distillate had been so collected, the alcohol distilled over water free. 500 parts of dioxane was then added and distillation continued until all ethanol had been replaced by dioxane. 37.5 parts of paraformaldehyde and 125 parts of morpholine were now added, and the temperature maintained at 70° C. for ½ hour. A solution containing 63.8 parts of silicon tetrachloride in 63.8 parts of dioxane was added dropwise over a period of 1 hour. A water dispersible, soft paste resulted containing 40% solids.

Two padding baths were prepared as follows:

A:
    30 grams of paste
    270 grams of water

B:
    30 grams of paste
    60 grams of ureaformaldehyde condensate
    210 grams of water Rayon fabrics were padded, dried at 120° C. for 3 minutes and cured at 150° C. for 3 minutes. The following spray ratings were secured:

|   | Initial | Two 2-hour Washes | 6 Dry Cleanings |
|---|---|---|---|
| A | 100 | 100 | 80 |
| B | 100 | 100 | 80 |

VII 60 parts of urea, 240 parts of 37% aqueous formaldehyde, 283 parts of stearamide, 1000 parts of anhydrous stonemill, and 141.5 parts of candelilla wax were charged into a 2 liter 3 neck flask provided with a thermometer, mechanical stirrer, and a distilling column connected directly to a distillation condenser. The bath was heated directly at 82° C. over a period of one hour and 500 parts of a water-alcohol azeotrope removed by distillation. 87.1 parts of morpholine, and 30 parts of paraformaldehyde were then added, and heating continued for ½ hour at 70° C. 38.3 parts of 85% phosphoric acid were added and heating continued at 60°–65° C. for 1 hour. A soft, creamy water dispersible paste containing 42% solids was secured.

VIII 63 parts of melamine, 240 parts of 37% aqueous formaldehyde, and 1000 parts of anhydrous methanol were charged into a 2 liter 3 neck flask provided with a thermometer, mechanical stirrer, and a distilling column connected to a distillation condenser. The batch was heated to 75° C. by means of a hot water bath in one hour. While continuously adding methanol to maintain a constant volume, 2000 parts of a water-methanol azeotrope were distilled over. The resulting hexamethylol melamine solution contained 47.8% solids.

400 parts of the above hexamethylol melamine, 216.8 parts of stearamide, 102 parts of candelilla wax and 100 parts of dioxane were heated together at 70° C. for 2 hours. 82.8 parts of morpholine were added at 70° C. Finally a solution of 36.2 parts of silicon tetrachloride in 81.2 parts of dioxane were added dropwise over a period of 1 hour. A soft paste was secured which was completely dispersible in water.

A series of water repellents were prepared employing various amines in place of morpholine. The following are exemplary. In both the preceding and following examples, it is desirable to neutralize the aqueous formaldehyde before use.

IX 50.4 parts of melamine
192.0 parts of 37% of formaldehyde
226.4 parts of stearamide
113.2 parts of candelilla wax
354.0 parts of isopropanol (99%)
  58.4 parts of diethylamine
  30.7 parts of phosphoric acid (85.4%)

X 50.4 parts of melamine
192.0 parts of 37% aqueous formaldehyde
226.4 parts of stearamide
113.2 parts of candelilla wax
354.0 parts of isopropanol (99%)
  80.8 parts of diisopropylamine
  30.7 parts of phosphoric acid (85.4%)

XI 50.4 parts of melamine
192.0 parts of 37% aqueous formaldehyde
226.4 parts of stearamide
113.2 parts of candelilla wax
354.0 parts of isopropanol (97%)
  84.0 parts of diethanolamine
  30.7 parts of phosphoric acid The following procedure was used in preparing products under Examples IX, X and XI:

The melamine, aqueous formaldehyde, stearamide, candelilla wax, and isopropanol were heated together in a 3 neck flask provided with a thermometer, stirrer, and water cooled condenser to 80° C. in 1 hour. The temperature was maintained for 1 hour at 80° C. The batch was cooled to 70° C. and the secondary amine added. After ¼ hour at this temperature the phosphoric acid was added over a period of 15 minutes and the product poured. All products were creamy, soft pastes readily dispersible in water.

XII

A melamine reaction product was prepared in the following manner:

50.4 parts of melamine, 192 parts of 37% aqueous formaldehyde, 226.4 parts of stearamine, 113.2 parts of candelilla wax, and 354 parts of isopropanol were heated together to 80° C. in 1 hour and this temperature maintained for 1 hour. The batch was cooled to 70° C. and 69.7 parts of morpholine added thereto.

XIII

A second melamine reaction product was prepared following the procedure of XII above except that no candelilla wax was employed.

XIV

An acidic reaction product was prepared as follows:
578 parts of methylene distearamide, 170 parts of silicon tetrachloride, 120 parts of paraformaldehyde, and 452 parts of dioxane were heated together in a 2 liter 3 neck flask provided with a thermometer, stirrer and water cooled condenser to 80° C. in 1½ hour. This temperature was maintained for 6 hours. An acidic reaction product was secured.

XV 130 parts of the above product XIV was added to the melamine reaction product XII (neither product alone being water dispersible) at 70° C. and the batch agitated at 70° C. for ½ hour. A soft cream-like paste resulted which was completely water dispersible.

XVI 130 parts of the above product XIV was added to the melamine reaction product XIII (neither product alone being water dispersible) at 70° C., and the batch agitated at 70° C. for ½ hour. A soft cream-like paste resulted which was completely water dispersible.

XVII

10% dispersions in water of each of products XV and XVI were prepared and padded on 9 oz. cotton sateen. The padded fabric was dried at 120° C. and baked at 150° C. for 3 minutes. The following spray ratings were secured:

|  | Initial | 2-hour Soap Wash | 1-hour Solvent Naphtha (dry cleaning) |
|---|---|---|---|
| XV | 100 | 100 | 70+ |
| XVI | 100 | 100 | 70+ |

XVIII 370 parts 98% isopropanol
226.4 parts stearamide
113.2 parts candelilla wax
50.4 parts melamine
72 parts paraformaldehyde The ingredients were mixed in the order given into a reaction vessel equipped with stirrer, reflux condenser and thermometer, and heated at 85° C. for 2 hours. Then 69.7 parts of morpholine were added slowly through the top of the reflux condenser and heating continued for ¾ hour. The batch was cooled to 70° C. and 36.8 parts of phosphorus trichloride added slowly through a dropping funnel, maintaining the temperature at 70° C. for 25 minutes. A clear solution resulted which when cooled to room temperature became a waxy paste. This was readily dispersible in water to give a solution which when applied to cotton fabric rendered the fabric water repellent.

XIX 305.1 parts of 98% isopropanol
226.4 parts of stearamide
113.2 parts of candelilla wax
36 parts of paraformaldehyde
36 parts of urea The ingredients were added to a reaction vessel in the order given above and heated with stirring under a reflux condenser at 85° C. for 2 hours. 34.8 parts of morpholine were added slowly through the top of the condenser and heating continued for 1 hour at 80°–85° C. Then 18.3 parts of phosphorus trichloride dissolved in 53.4 parts of dioxan were added slowly at 70° C. over a period of 35 minutes. When cooled to room temperature a soft waxy solid resulted which was readily dispersible in water. A water dispersion rendered cotton fabric water repellent.

Since complex products are produced, no limitation by way of illustrative formulation is intended. But to illustrate products that may be present the following simplified formulations are exemplary. Thus where melamine is a reactant the following is illustrative:

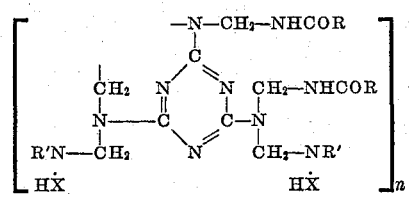

where:

$R = C_yH_{2y-1}-$ and $y = 12$ or higher
$R' =$ cyclic, alicyclic, heterocyclic lower alkyl—
$X =$ acid radical $Cl^-$, $Br^-$, $H_2PO_3^-$, $HSO_4^-$, $SO_4^{--}$, etc.
$n$ is probably a small integer.

While for urea, the following is given:

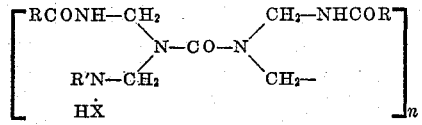

where R, R', X and n have the values referred to above.

Having thus set forth our invention, we claim:

1. The method of making water dispersible water-repellents which comprises heating all in amounts for stoichiometric reaction a fatty acid amide of at least nine carbon atoms, with a substance yielding formaldehyde under reaction conditions, heating the resulting product with a secondary amine to form a tertiary amine, and heating the latter with a salt forming acid compound capable of converting the tertiary amine into a water-dispersible non-quaternary tertiary amine salt, the heating being carried out at any temperature up to and including those producing refluxing, the final product being substantially completely dispersible in water and in 10% water solution giving a pH of from about 3.0 to 6.0, in which the fatty acid amide is heated with a urea having a plurality of nitrogen atoms with aldehyde reactive N-hydrogen thereon.

2. The method of making water dispersible water-repellents which comprises heating all in amounts for stoichiometric reaction a fatty acid amide of at least nine carbon atoms, with a substance yielding formaldehyde under reaction conditions, heating the resulting product with a secondary amine to form a tertiary amine, and heating the latter with a salt forming acid compound capable of converting the tertiary amine into a water-dispersible non-quaternary tertiary amine salt, the heating being carried out at any temperature up to and including those producing refluxing, the final product being substantially completely dispersible in water and in 10% water solution giving a pH of from about 3.0 to 6.0, in which the fatty acid amide is heated with a formaldehyde reaction product of a urea having a plurality of nitrogen atoms with aldehyde reactive N-hydrogen thereon.

3. The method of making water dispersible water-repellents which comprises heating all in amounts for stoichiometric reaction a fatty acid amide of at least nine carbon atoms, with a substance yielding formaldehyde under reaction conditions, heating the resulting product with a secondary amine to form a tertiary amine, and heating the latter with a salt forming acid compound capable of converting the tertiary amine into a water-dispersible non-quaternary tertiary amine salt, the heating being carried out at any temperature up to and including those producing refluxing, the final product being substantially completely dispersible in water and in 10% water solution giving a pH of from about 3.0 to 6.0, which includes the further steps of dispersing the tertiary amine salt in water and impregnating a textile with the dispersion, drying, and curing the dried textile.

4. A stoichiometric water-dispersible non-quaternary tertiary amine salt of the secondary amine reaction product with a formaldehyde-long chain fatty acid amide-urea reaction product, the amide having at least nine carbon atoms, and the urea having a plurality of nitrogen atoms with aldehyde reactive N-hydrogen thereon, the reaction products being formed by heating at any temperatures up to and including refluxing.

5. A stoichiometric water-dispersible non-quaternary tertiary amine salt of the secondary amine reaction product with a fatty acid amide reaction product of a long chain fatty acid amide and a formaldehyde reaction product of a urea having a plurality of nitrogen atoms with aldehyde reactive N-hydrogen thereon, the reaction products being formed by heating at any temperatures up to and including refluxing.

6. A textile carrying a cured product of claim 4.

7. A textile carrying a cured product of claim 5.

8. The method of making water dispersible water-repellents which comprises heating all in amounts for stoichiometric reaction a fatty acid amide of at least nine carbon atoms, with a substance yielding formaldehyde under reaction conditions, heating the resulting product with a secondary amine to form a tertiary amine, and heating the latter with a salt forming acid compound capable of converting the tertiary amine into a water-dispersible non-quaternary tertiary amine salt, the heating being carried out at any temperature up to and including those producing refluxing, the final product being substantially completely dispersible in water and in 10% water solution giving a pH of from about 3.0 to 6.0, in which the fatty acid amide is heated with a urea having a plurality of nitrogen atoms with aldehyde reactive N-hydrogen thereon, and the salt forming acid compound is inorganic.

9. The method of claim 88 in which the compound is silicon tetrachloride.

10. The method of claim 8 in which the compound is phosphoric acid.

11. A stoichiometric water-dispersible non-quaternary tertiary amine salt of the secondary amine reaction product with a formaldehyde-long chain fatty acid amide reaction product, the amide having at least nine carbon atoms, the reaction products being formed by heating at any temperatures up to and including refluxing, in which the salt is formed by a salt forming compound which is inorganic.

12. The salt of claim 11 in which the compound is silicon tetrachloride.

13. The salt of claim 11 in which the compound is phosphoric acid.

14. The salt of claim 4 in which the salt is formed by a salt forming compound which is inorganic.

15. The salt of claim 14 in which the salt forming compound is silicon tetrachloride.

16. The salt of claim 14 in which the salt forming compound is phosphoric acid.

References Cited in the file of this patent

UNITED STATES PATENTS

| | | |
|---|---|---|
| 1,952,008 | Bruson | Mar. 20, 1934 |
| 2,189,648 | Gruenther et al. | Feb. 6, 1940 |
| 2,205,355 | Grimm et al. | June 18, 1940 |
| 2,557,653 | Green | June 19, 1951 |

UNITED STATES PATENT OFFICE

CERTIFICATE OF CORRECTION

Patent No. 2,923,698            February 2, 1960

John B. Rust et al.

It is hereby certified that error appears in the above numbered patent requiring correction and that the said Letters Patent should read as corrected below.

In the grant, lines 1 and 2, for "John B. Rust, of Verona, and William B. Canfield, of Montclair, New Jersey," read -- John B. Rust, of Verona, and William B. Canfield, of Montclair, New Jersey, assignors, by direct and mesne assignments, of one-half to Montclair Research Corporation, a corporation of New Jersey, and one-half to Ellis-Foster Company, a corporation of New Jersey, --;  line 11, for "John B. Rust and William B. Canfield, their heirs" read -- Montclair Research Corporation and Ellis-Foster Company, their successors --; in the heading to the printed specification, lines 4 and 5, for "John B. Rust, Verona, and William B. Canfield, Montclair, N. J." read -- John B. Rust, Verona, and William B. Canfield, Montclair, N. J., assignors, by direct and mesne assignments, of one-half to Montclair Research Corporation, a corporation of New Jersey, and one-half to Ellis-Foster Company, a corporation of New Jersey --.

Signed and sealed this 16th day of August 1960.

(SEAL)
Attest:
KARL H. AXLINE
Attesting Officer

ROBERT C. WATSON
Commissioner of Patents